United States Patent
Salyers et al.

(10) Patent No.: US 9,355,173 B1
(45) Date of Patent: May 31, 2016

(54) USER KEYWORDS AS LIST LABELS

(71) Applicant: IMDB.com, Inc., Seattle, WA (US)

(72) Inventors: Tanya Salyers, Seattle, WA (US); Scott Thomas Moran, Seattle, WA (US); Yann Thierry Oehl, Seattle, WA (US); Hilliard Bruce Siegel, Seattle, WA (US); Jinesh Udaykumar Vora, Issaquah, WA (US)

(73) Assignee: IMDb.com, Inc., Seattle, WA (US)

( * ) Notice: Subject to any disclaimer, the term of this patent is extended or adjusted under 35 U.S.C. 154(b) by 213 days.

(21) Appl. No.: 14/037,709

(22) Filed: Sep. 26, 2013

(51) Int. Cl.
*G06F 17/30* (2006.01)

(52) U.S. Cl.
CPC ............................ *G06F 17/30705* (2013.01)

(58) Field of Classification Search
CPC ............ G06F 17/30867; G06F 17/30864; G06F 17/3053; G06F 17/30554; G06F 17/3064; G06F 17/3087; G06F 17/3097; G06F 17/30979; G06F 17/30905; G06F 17/30539; G06F 17/30657; G06F 17/30696

USPC ........................... 707/99.001–999.206
See application file for complete search history.

(56) References Cited

U.S. PATENT DOCUMENTS

| | | | |
|---|---|---|---|
| 2008/0046929 A1* | 2/2008 | Cho et al. | 725/46 |
| 2008/0126191 A1* | 5/2008 | Schiavi | G06Q 30/0258 |
| | | | 705/14.56 |
| 2008/0294622 A1* | 11/2008 | Kanigsberg et al. | 707/5 |
| 2012/0066203 A1* | 3/2012 | Robert | 707/711 |
| 2013/0145400 A1* | 6/2013 | Chang et al. | 725/53 |

* cited by examiner

*Primary Examiner* — Angelica Ruiz
(74) *Attorney, Agent, or Firm* — Thomas | Horstemeyer, LLP

(57) ABSTRACT

Disclosed are various embodiments for forming relationships among items to enhance user experiences in navigating a content database. A user may initiate a request to associate a keyword or label with an item. The keyword may be associated with the user to form a user-keyword association and may be associated with the item to form an item-keyword association. If the item-keyword association meets a predefined threshold, the keyword may be surfaced as a community keyword corresponding to the item.

20 Claims, 8 Drawing Sheets

FIG. 4

USER KEYWORDS AS LIST LABELS

BACKGROUND

Various network pages exist that provide users with information about products or services that may be used by a respective user in determining to purchase a product or service. Discovering relationships among these products or services remains problematic and leads to users not being able to effectively discover new products or content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a pictorial diagram of an example user interface rendered by a client in the networked environment of FIG. 2 according to various embodiments of the present disclosure.

DETAILED DESCRIPTION

The present disclosure relates to forming relationships among items to enhance user experiences in navigating a content database. Various sites accessible over a network provide users with information about products or services, and this information may be used by a respective user in determining to purchase a product or service. For example, a site may provide a user with information about movies, thereby assisting the user in determining whether to watch or purchase particular ones of the movies. Discovering classifications of these movies remains problematic and impairs user discovery of new movies or content.

As a non-limiting example, a user may navigate to a movie description page containing information about a movie. The movie description page may contain various keywords associated with the movie that are related to the genre of the movie, the plot, the actors, etc. For example, a movie description page for a movie entitled "The Magician" may have the keywords "magic" or "fantasy." Yet, keywords provided by administrators or other users may be unreliable and may not be descriptive of the movie.

Accordingly, a system where users are able to provide keywords for items may be beneficial, where the keywords are scrutinized to determine the reliability of the keywords in describing particular items. When navigating a database of the items, the user may be able to view his or her provided keywords, hence customizing the experience for the user. Additionally, when a keyword provided by one or more users for a particular item meets a threshold indicating a reliability of the keyword, the keyword may be surfaced as a community keyword and may be viewed by other users. The community keywords may be helpful in navigating a site and may lead to the discovery of additional items or content. In the following discussion, a general description of the system and its components is provided, followed by a discussion of the operation of the same.

Figure 1:
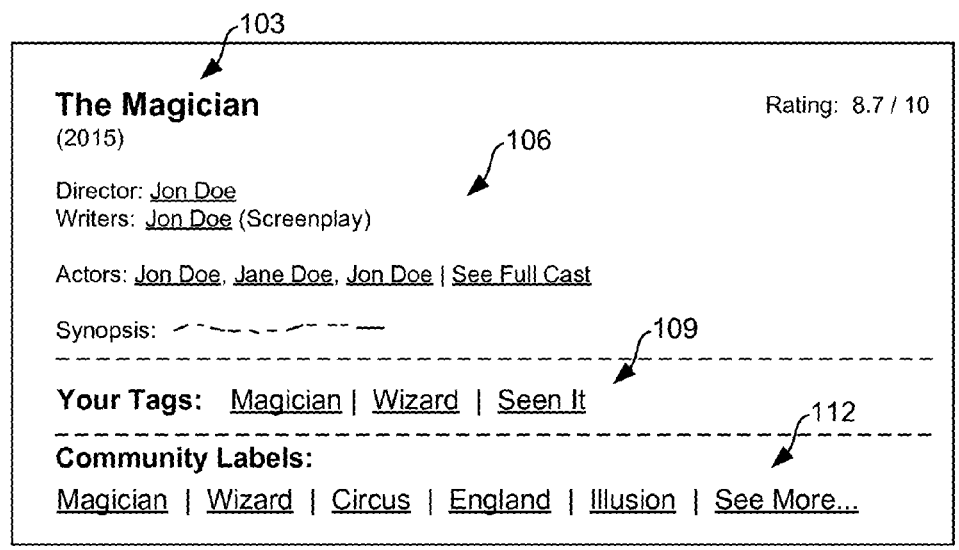
FIG. 1 is a pictorial diagram of a portion of an example user interface rendered by a client according to various embodiments of the present disclosure.

With reference to FIG. 1, shown is a pictorial diagram of a portion of an example user interface that may be rendered by a client according to various embodiments. As discussed above, network pages may provide information about an item. In the non-limiting example of FIG. 1, an item may comprise a movie 103, wherein the user interface is encoded to provide movie information 106 to one or more users.

Users may be permitted the ability to generate labels, tags, or keywords to be associated with particular items, as depicted by a user-keyword portion 109 of the user interface. For example, a user may provide a label "seen it," indicating that the user has viewed the movie. The user-keyword portion 109 may be shown only to the user who has submitted the labels or keywords, providing the user with a custom site experience. Yet, as various users provide labels or keywords, particular ones of the keywords may be weighted to determine community keywords. Community keywords may comprise, for example, a uniform set of keywords that may be used in association with an item and will not vary from user to user. Community keywords may be shown in, for example, an item-keyword portion 112 of the user interface. Associating keywords with particular items, and determining which keywords to surface as community keywords, will be described in greater detail below.

Figure 2:
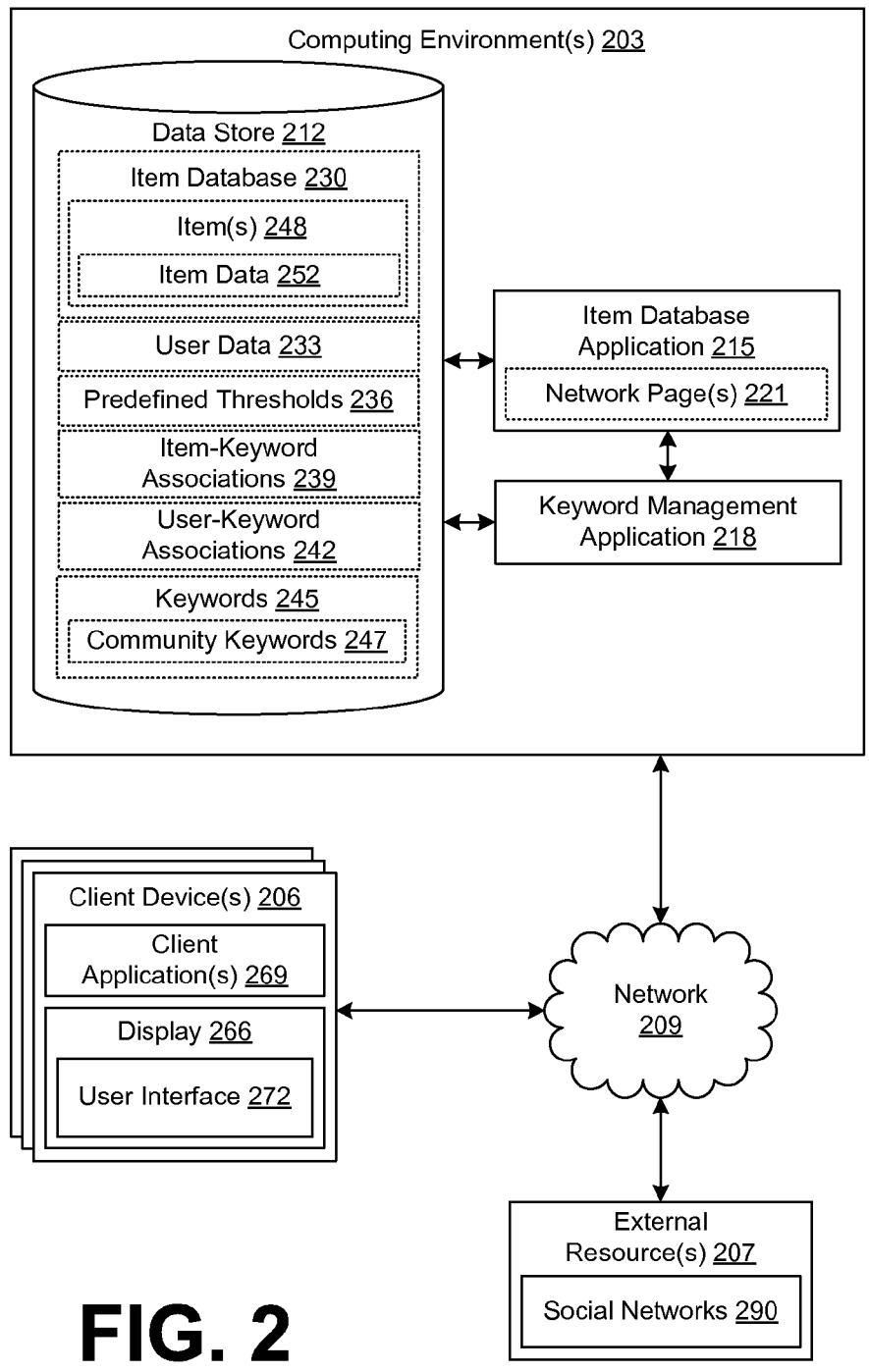
FIG. 2 is a drawing of a networked environment according to various embodiments of the present disclosure.

Turning now to FIG. 2, shown is a networked environment 200 according to various embodiments. The networked environment 200 includes a computing environment 203, a client device 206, and external resources 207, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an item database application 215, a keyword management application 218, and other applications, services, processes, systems, engines, or functionality not discussed in detail herein.

The item database application 215 is executed in order to facilitate the presentation of data associated with items over the network 209. For example, the item database application 215 may comprise a database of movies having information associated with movies such as a synopsis, cast, crew, filming location, etc. The item database application 215 performs various backend functions to facilitate the presentation of item data 252 as will be described. For example, the item database application 215 generates network pages 221 such as web pages, mobile application data, or other types of network content that are sent to client devices 206 for the purposes of providing items for consumption by users of the item database application 215. In addition, the item database application 215 may generate network pages 221 and/or render media content for the purchase, rental, download, or lease of an item. According to various embodiments, an item database application 215 may comprise an electronic commerce system.

The keyword management application 218 is executed in order to form user-keyword and item-keyword associations based on requests submitted by users of the item database application 215. For example, a user of the item database application 215 may initiate a request to associate a keyword with a particular item. The keyword management application 218 may associate the keyword with the particular item as well as associate the keyword with the requesting user. In addition, the keyword management application 218 may determine whether a keyword for a particular item is reliably descriptive of the item so as to warrant the keyword to be surfaced as a community keyword, as will be described in greater detail below.

The data stored in the data store 212 includes, for example, data residing in an item database 230, user data 233, predefined thresholds 236, item-keyword associations 239, user-keyword associations 242, keywords 245, community keywords 247, and potentially other data. The data residing in an item database 230 may contain information associated with a plurality of items 248. Each item 248 may have item data 252 corresponding to the particular item 248. Item data 252 may comprise, for example, a title, an item description, a genre, and/or various information associated with an item 248. The user data 233 may comprise information associated with a user of a network site and/or a social networking site, such as gender, age, address, location, phone number, Internet Protocol (IP) address, e-mail address, various user preferences, external social networking accounts, and/or any other information associated with the user. The user data 233 may be used in determining keywords 245 to be presented to the corresponding user, as will be discussed in greater detail below.

Predefined thresholds 236 may comprise, for example, configurable thresholds that are used in the determination of whether a keyword 245 used in forming an item-keyword association 239 is reliably descriptive of a particular item 248. If an item-keyword association 239 is reliably descriptive, determined using the predefined threshold 236, the keyword 245 may be surfaced as a community keyword, as will be discussed in greater detail below. According to one embodiment, a predefined threshold 236 may comprise a numeric integer. When a number of the same or similar item-keyword associations 239 has been reached, it may be determined that the item-keyword association 239 is reliably descriptive.

According to another embodiment, a predefined threshold 236 may comprise, for example, predefined heuristics. For example, a predefined heuristic may employ the use of a "whitelist," a "blacklist," or a combination thereof, in the determination of whether to surface a keyword 245 as a community keyword 247. A predefined list of permissible keywords 245 (i.e., a whitelist) may be used to determine a weight of a keyword 245, increasing the likelihood of the keyword 245 being surfaced as a community keyword 247. Similarly, a predefined list of non-permissible keywords 245 (i.e., a blacklist) may be used to determine a weight of a keyword 245, decreasing the likelihood of the keyword 245 being surfaced as a community keyword 247.

According to yet another embodiment, a predefined heuristic may employ the use of an age of the keyword 245 in the determination whether to surface a keyword 245 as a community keyword 247. For example, as a keyword 245 becomes less relevant (e.g., due to a change in common speech habits) in describing an item 248 or a movie, a keyword 245 may be afforded less weight. Thus, the weight of a keyword 245 may decay over time. However, additional requests to associate a particular item with the keyword 245 may increase the relevancy and reliability of the keyword 245 over time.

Item-keyword associations 239 may comprise, for example, an association between a particular item 248 stored in memory with a particular keyword 245. Similarly, user-keyword associations 242 may comprise, for example, an association between a particular user of the item database application 215 with a particular keyword 245. Keywords 245 may comprise, for example, a word, set of words, phrase, category, etc., provided by one or more users or administrators that may be used to describe an item 248. Community keywords 247 may comprise, for example, a subset of keywords 245 that are reliably descriptive of particular items 248.

The client device 206 is representative of one or more client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 266. The display 266 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 269 and/or other applications. The client application 269 may be executed in a client device 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page, an application screen, etc. The client device 206 may be configured to execute applications beyond the client application 269 such as, for example, email applications, social networking applications, word processors, spreadsheets, and/or other applications.

The external resources 207 are representative of a plurality of external computing devices, services, network sites, and/or application programming interfaces (APIs) used by the keyword management application 218. For example, the keyword management application 218 may communicate with a plurality of social networks 290 in order to determine demographics, preferences, and/or any information associated with one or more users through an API or similar method. Additionally, the item database application 215 may be used to facilitate sharing of lists generated by the keyword management application 218 among various network sites or social networks 290, as will be discussed in greater detail below.

Next, a general description of the operation of the various components of the networked environment 200 is provided. To begin, as a non-limiting example, a user may initiate a request to associate a keyword 245 with a particular item. The keyword management application 218 may identify the keyword 245 in the request received from, for example, the client device 206 or any other service or device. Subsequently, the keyword 245 identified in the request may be associated with the user providing the keyword 245 in the request to form a user-keyword association 242. As a non-limiting example, the user-keyword association 242 may be stored in a data store 212 or like memory.

The keyword management application 218 may associate the keyword 245 set forth in the request with one or more items to form one or more item-keyword associations 239. As a non-limiting example, the item-keyword association 239 may be stored in a data store 212 or like memory. As may be appreciated, numerous users may provide a variety of keywords 245 for a plurality of items 248. It may be beneficial to further scrutinize the submitted keywords 245 to determine which keywords 245 may be beneficial in categorizing items 248, thus facilitating the determination of which keywords 245 may be surfaced as community keywords 247.

Thus, the keyword management application 218 may determine whether the item-keyword association 239 has met or exceeded a predefined threshold 236 indicating a reliability of the keyword 245 in correctly describing the particular item 248. For example, numerous users may have submitted the keyword 245 "magic" in association with a movie titled "The Magician." When a number of requests comprising the item-keyword association 239 of "magic" with "The Magician" have exceeded a predefined threshold 236, it may be understood that the item-keyword association 239 is reliable for describing the movie "The Magician." Accordingly, the keyword 245 may be surfaced to the community, as will be described in greater detail below.

If the item-keyword association 239 has met the predefined threshold 236, the keyword 245 may be surfaced. According to one embodiment, surfacing may comprise, for example, encoding the keyword 245 in an item description page as a community keyword 247, as will be described in greater detail below. Encoding the keyword 245 in the item description page may further comprise, for example, encoding the keyword as a hyperlink, wherein a manipulation of the hyperlink by a user of the item description page may initiate one or more subsequent user interfaces comprising a plurality of items 248 associated with the manipulated hyperlink.

The keyword management application 218 may generate and/or update one or more lists comprising one or more items 248 for the keyword 245 identified in the request. According to one embodiment, the list may comprise item-keyword associations 239. For example, a list for the keyword 245 "magic" may be generated and encoded in a user interface, wherein the list comprises a plurality of movies associated with the "magic" keyword 245. The list may comprise items 248 associated with a respective keyword 245 and/or items associated with keywords 245 similar to the respective keyword 245.

Alternatively, the list may comprise user-keyword associations 242. For example, a list showing all keywords 245 associated by a user with each of the keyword's respective items 248 may be generated and encoded in a user interface, wherein the list comprises a plurality of movies associated with keyword(s) provided by the user.

Additionally, the keyword management application 218 may reward an initial user if an item-keyword association 239 pioneered by the initial user has met the predefined threshold 236, thus leading to the keyword 245 being surfaced as a community keyword 247. An initial user may comprise, for example, the first user to initiate a request to associate the particular item 248 with the particular keyword 245 to form the item-keyword association 239. Similarly, the keyword management application 218 may reward more than one user, by rewarding, for example, a predefined number (N) of users who initiated at least one of a plurality of first received requests to associate the keyword with the item. The predefined number N may comprise, for example, a percentage or a number of a portion of the first users to associate a keyword 245 that later became surfaced as a community keyword 247 corresponding to an item 248. A reward may comprise, for example, providing the user with access to particular content, affording the user more weight in future requests, encoding an icon (e.g., a badge) next to the user's name in various user interfaces, etc. The reward may provide users of the system with an incentive to continue generating reliable item-keyword associations 239.

Figure 3A:
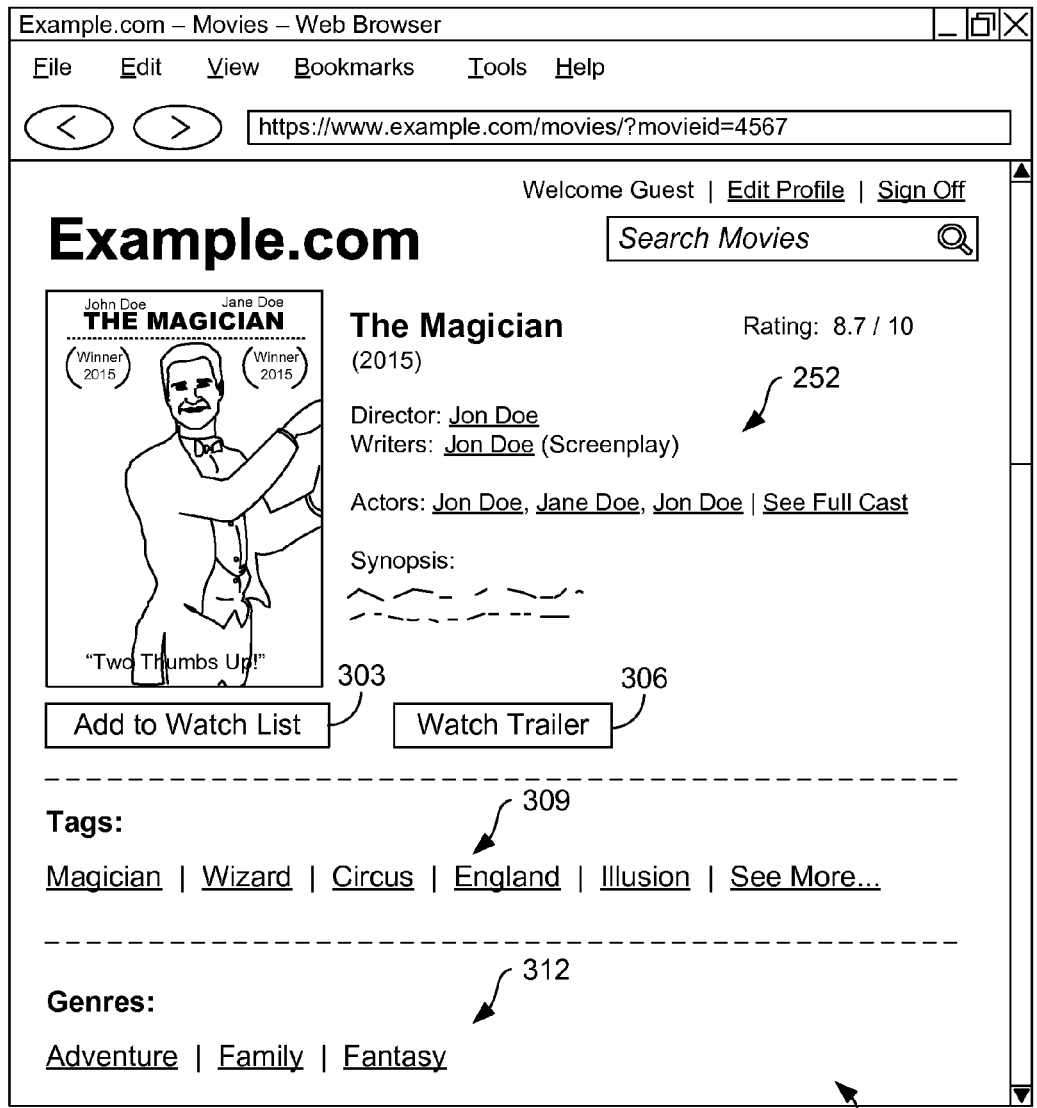
FIGS. 3A-3B are pictorial diagrams of example user interfaces rendered by a client in the networked environment of FIG. 2 according to various embodiments of the present disclosure.

Referring next to FIG. 3A, shown is a pictorial diagram of an example user interface 272 rendered by the client device 206 (FIG. 2) in the networked environment 200 of FIG. 2 according to various embodiments of the present disclosure. In the non-limiting example of FIG. 3A, a user interface 272 may comprise an item description page, providing users with information about the item, such as item data 252. For example, as shown in FIG. 3A, an item may comprise a movie and item data 252 may comprise information about the movie such as, for example, the synopsis, cast, crew, filming locations, reviews, rating, etc. A watch list component 303 may be encoded in the user interface 272 such that, when manipulated, the movie corresponding to the respective item description page may be added to a list. Similarly, a watch trailer component 306 may be encoded in the user interface 272 such that, when manipulated, a series of subsequent user interfaces 272 may be rendered to play a movie trailer corresponding to the movie.

Also depicted in FIG. 3A are a plurality of tags 309, or keywords 245 (FIG. 2), that may be descriptive of the movie corresponding to the item description page. For example, the movie "The Magician," depicted in FIG. 3A, may be associated with the keywords 245 "magician," "wizard," "circus," "England," "illusion," etc. The keywords 245 may be encoded in the user interface 272 as hyperlinks. Accordingly, when manipulated by a user, a hyperlink may initiate the rendering of a series of additional user interfaces 272 corresponding to the manipulated hyperlink. For example, upon a manipulation of the "magician" hyperlink, an additional user interface 272 may be rendered comprising a plurality of items also associated with the "magician" keyword 245, as will be described in detail with respect to FIG. 4. Similarly, one or more genres 312 may be associated with the item and may be encoded in the user interface 272 as hyperlinks, as described above.

Figure 3B:
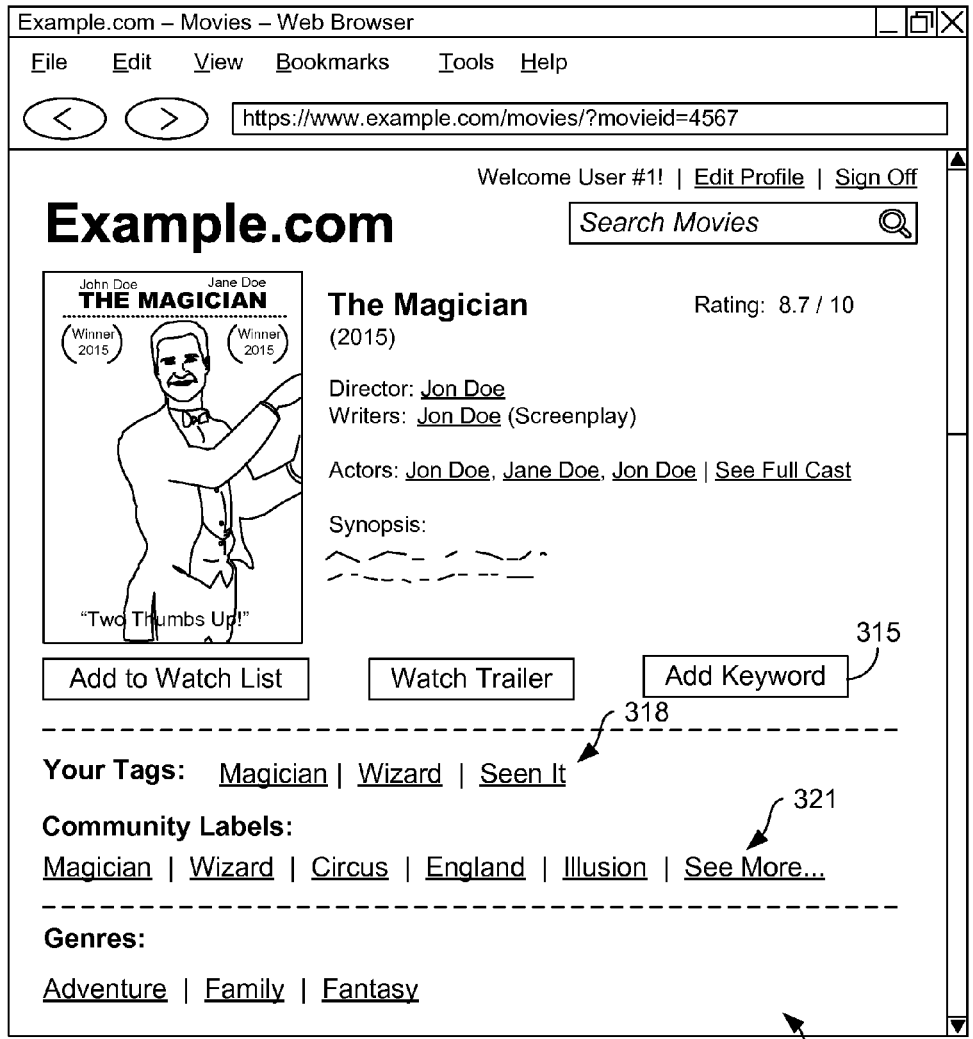

Turning now to FIG. 3B, shown is a pictorial diagram of an example user interface 272 rendered by the client device 206 (FIG. 2) in the networked environment 200 of FIG. 2 according to various embodiments of the present disclosure. In the non-limiting example of FIG. 3B, an add keyword component 315 may be encoded in the user interface 272. Upon a manipulation of the add keyword component 315, a request to associate a keyword 245 (FIG. 2) with the item 248 (FIG. 2) depicted in the item description page may be created. For example, a user may manipulate the add keyword component 315 to submit a request to the keyword management application 218 (FIG. 2) to associate the "Seen It" keyword to the item 248. The keyword management application 218 may associate the keyword 245 with the item 248 to form an item-keyword association 239 (FIG. 2) as well as to associate the keyword 245 with the user to form a user-keyword association 242 (FIG. 2).

The user-keyword association 242 may be used, for example, to encode the keywords 245 associated with the item 248 by the user in a user portion 318 of the user interface 272. As may be appreciated, this portion of the user interface 272 may vary from user to user. Additionally, the item-keyword association 239 may be used, for example, to encode community keywords 247 in a community portion 321 of the user interface 272. As may be appreciated, this portion of the user interface 272 may be uniform throughout the community and will not vary from user to user. Thus, a user interface 272 comprising the community keywords 247 may be generated irrespective of the user requesting the user interface 272. However, according to various embodiments, the community keywords 247 may be scored to determine community keywords 247 most relevant for a respective user. Based on the score, it may be determined which community keywords 247 to encode in the user interface 272 for the respective user. For example, it may be determined that the keyword 245 "magic" may be of a higher interest for a particular user than the keyword "action." Thus, the keyword 245 "magic" may be afforded a score, making it more likely the keyword 245 will be surfaced to the particular user.

Figure 4:
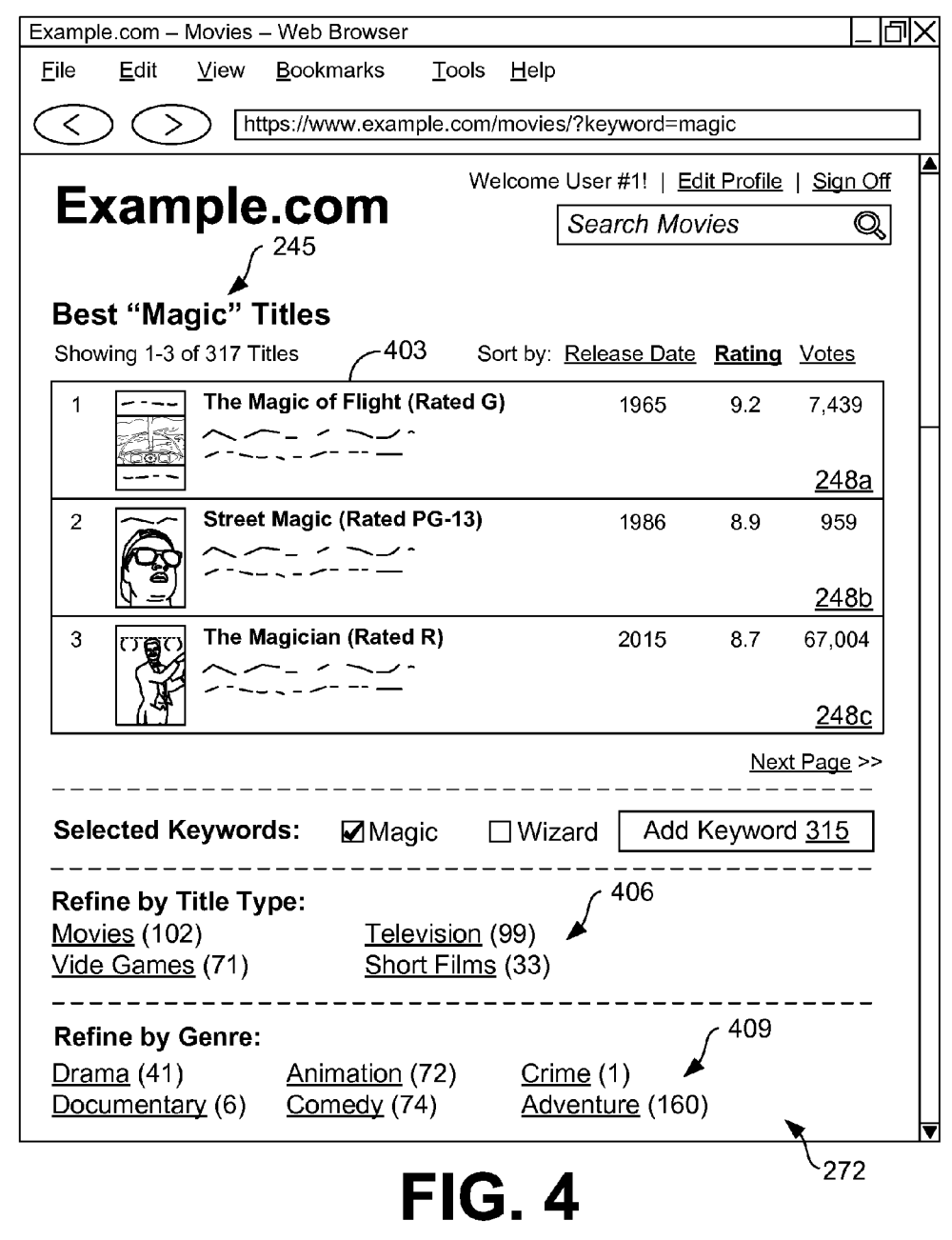

Moving on to FIG. 4, shown is a pictorial diagram of an example user interface 272 rendered by the client device 206 (FIG. 2) in the networked environment 200 of FIG. 2 according to various embodiments of the present disclosure. In the non-limiting example of FIG. 4, shown is a list 403 of a plurality of items 248a, 248b, 248c, wherein each of the items 248 corresponds to a respective keyword 245. The list 403, for example, comprises a plurality of movies, each of the movies corresponding to the "magic" keyword 245. As may be appreciated, by viewing the user interface 272, a user may be able to find other content based on similarities with other movies based on item-keyword associations 239 (FIG. 2) crowd-sourced among a plurality of users.

The list 403 may be sorted, refined, or otherwise filtered. For example, a user may manipulate an add keyword component 315 to locate items associated with more than one keyword 245. Similarly, a user may refine the list of items 248 according to title via a title refinement component 406 or the user may refine the list of items 248 according to a genre via a genre refinement component 409.

Figure 5:
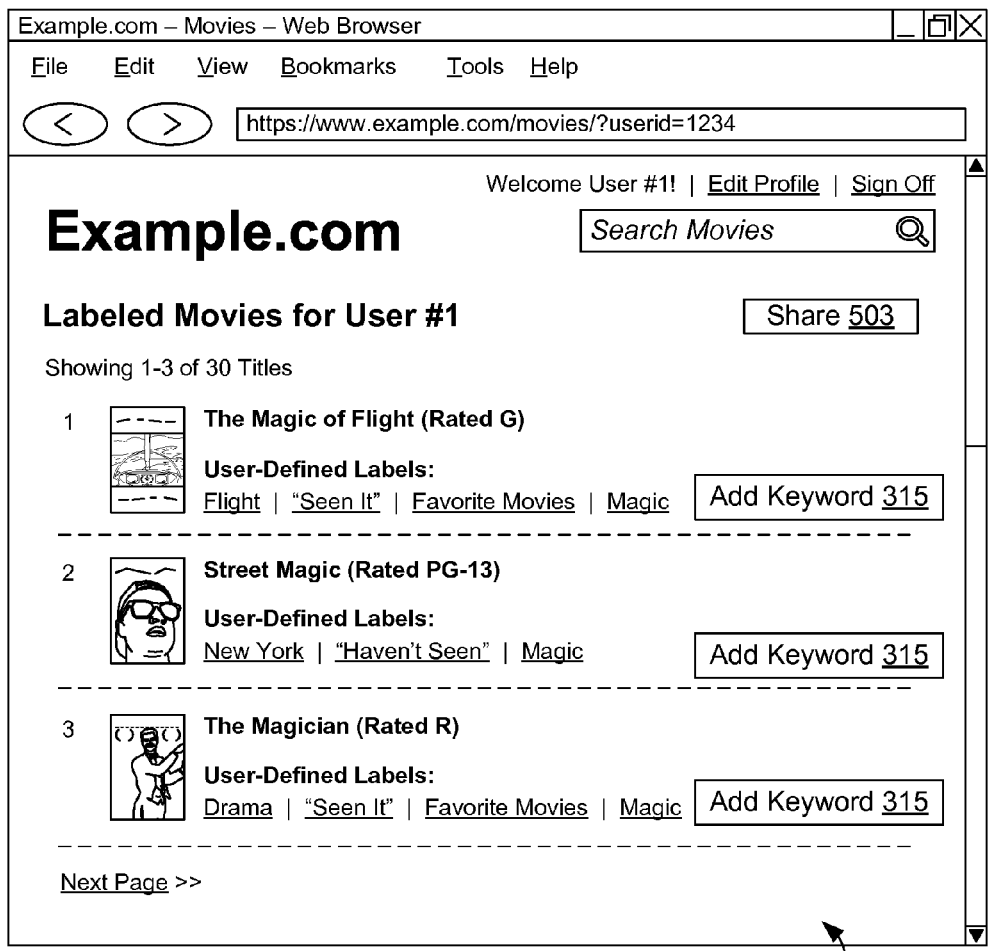
FIG. 5 is a pictorial diagram of an example user interface rendered by a client in the networked environment of FIG. 2 according to various embodiments of the present disclosure.

Turning now to FIG. 5, shown is a pictorial diagram of an example user interface 272 rendered by the client device 206 (FIG. 2) in the networked environment 200 of FIG. 2 according to various embodiments of the present disclosure. In the non-limiting example of FIG. 5, shown is a list of a plurality of items 248 (FIG. 2), wherein each of the items 248 corresponds to a respective keyword 245 given by a respective user (e.g., "User #1"). The list of items 248 comprises, for example, a plurality of movies. The keywords 245 associated with each of the movies may be shown in association with the movie. An add keyword component 315 may facilitate creating new item-keyword associations 239 (FIG. 2).

As may be appreciated, a user may be able to customize user-generated item-keyword associations 239 via the user interface 272. For example, the user may be able to add the "Seen It" keyword 245 for movies the user has watched. Similarly, the user may be able to add the "Haven't Seen" keyword for movies the user has yet to watch. By engaging one of the keywords 245, encoded in the form of a hyperlink, button, checkbox, or other user interface component, the user may inspect additional user interfaces 272 having lists of items 248 associated with that keyword 245. For example, by manipulating a component corresponding to the "Seen It" keyword 245, a user may be taken to a user interface 272 comprising a list of movies the user has yet to watch. A share component 503 may initiate the sharing of the respective user interface 272, for example, via one or more social networks 290 (FIG. 2).

Figure 6:
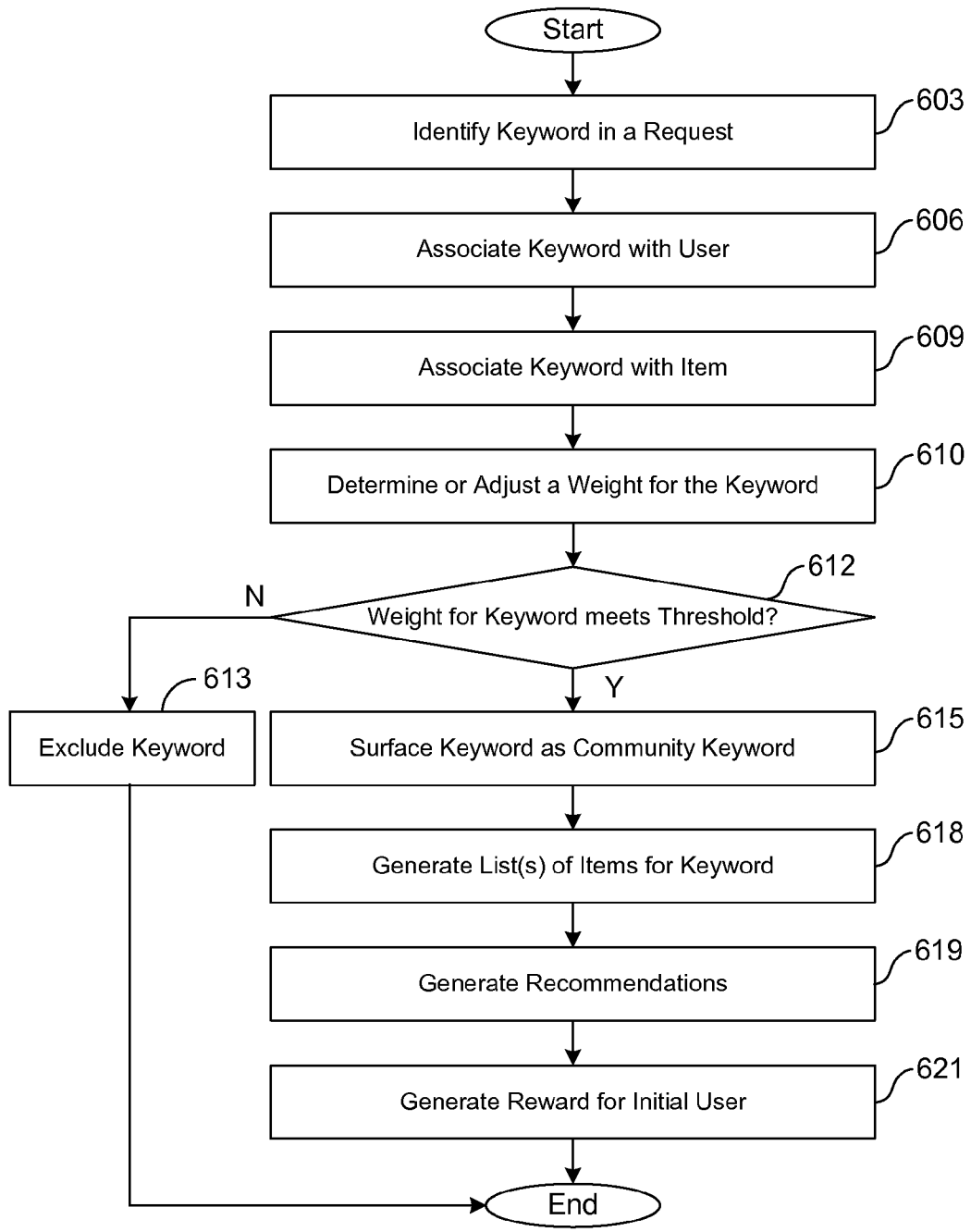
FIG. 6 is a flowchart illustrating one example of functionality implemented as portions of a keyword management application executed in a computing environment in the networked environment of FIG. 2 according to various embodiments of the present disclosure.

Referring next to FIG. 6, shown is a flowchart that provides one example of the operation of a portion of the keyword management application 218 according to various embodiments. It is understood that the flowchart of FIG. 6 provides merely an example of the many different types of functional arrangements that may be employed to implement the operation of the portion of the keyword management application 218 as described herein. As an alternative, the flowchart of FIG. 6 may be viewed as depicting an example of elements of a method implemented in the computing environment 203 (FIG. 2) according to one or more embodiments.

Beginning with 603, a keyword 245 is identified in a request. As a non-limiting example, a user may initiate a request to associate a keyword 245 with a particular item 248. As discussed above with respect to FIG. 3B, a user may manipulate a component (e.g., an add keyword component 315) in a user interface 272 (FIG. 2) that initiates a request to associate a keyword 245 with an item 248 depicted in the user interface 272. A keyword 245 may be a descriptive word or a combination of words that may be provided by the user describing the item 248.

Next, in 606, the keyword 245 identified in the request may be associated with the user providing the keyword 245 in the request to form a user-keyword association 242. As a non-limiting example, the user-keyword association 242 may be stored in a data store 212 or like memory.

In 609, the keyword 245 identified in the request may be associated with one or more items 248 corresponding to the request to form an item-keyword association 239. As a non-limiting example, the item-keyword association 239 may be stored in a data store 212 or like memory. As may be appreciated, numerous users may provide a variety of keywords 245 for a plurality of items 248. It may be beneficial to further scrutinize the submitted keywords to determine which keywords may be beneficial in categorizing items, thus facilitating the determination of which keywords 245 may be surfaced as community keywords 247.

Thus, in 610, a weight may be assigned to the keyword 245, wherein the weight indicates a reliability of the keyword 245 in correctly describing the particular item 248. A weight for a respective keyword 245 may be determined, for example, based at least in part on the number of requests created by users to form the association between the item 248 and the keyword 245. Additionally, the weight may be based at least in part on a user initiating the request, wherein users with a measured accuracy of keyword submissions may be afforded more or less credibility in determining a weight.

According to various embodiments, the weight may be adjusted according to the age of the keyword 245. For example, as a keyword 245 becomes less relevant (e.g., due to a change in common speech habits) in describing an item 248 or a movie, a keyword 245 may be afforded less weight. Thus, the weight of a keyword 245 may decay over time, while additional submissions of the keyword 245 may increase the weight such that the keyword 245 maintains relevancy.

In addition, a "whitelist," a "blacklist," or a combination thereof may be used in the determination of a weight for a keyword 245. For example, a predefined list of permissible keywords 245 (i.e., a whitelist) may be used to determine a weight of a keyword 245, increasing the likelihood of the keyword 245 being surfaced as a community keyword 247. Similarly, a predefined list of non-permissible keywords 245 (i.e., a blacklist) may be used to determine a weight of a keyword 245, decreasing the likelihood of the keyword 245 being surfaced as a community keyword 247.

According to various embodiments, users may have the ability to rate keywords 245. For example, a keyword 245 may be encoded in a user interface 272 corresponding to a rating feature that, when manipulated, permits a user to provide whether the user found the keyword 245 descriptive of the item 248. As a non-limiting example, an up-arrow and a down-arrow may be employed as the rating feature, wherein manipulating the up-arrow indicates the user found the keyword 245 helpful in describing the item 248 and the down-arrow indicates the user found the keyword 245 not helpful in describing the item 248.

In 612, it is determined whether the weight of a keyword 245 has met or exceeded a predefined threshold 236 indicating a reliability of the keyword 245 in correctly describing the particular item 248. For example, numerous users may have submitted the keyword "magic" in association with a movie titled "The Magician." When a number of requests comprising the item-keyword association 239 of "magic" with "The Magician" have exceeded a predefined threshold 236, it may be understood that the item-keyword association 239 is reliable for describing the movie "The Magician." Accordingly, the keyword 245 may be surfaced to the community, as will be described in greater detail below.

If the item-keyword association 239 has not met the predefined threshold 236, the keyword 245 may be excluded in 613 and the analysis of the item-keyword association 239 ends, although the item-keyword association 239 may be maintained in a data store 212 or like memory to be examined at a later time (e.g., when another user initiates a request comprising the same item-keyword association 239). Excluding the keyword 245 may comprise, for example, prohibiting the keyword 245 from being encoded in a user interface 272 corresponding to the item 248 subject to the item-keyword association 239.

Alternatively, if the item-keyword association 239 has met the predefined threshold 236, in 615, the keyword 245 may be surfaced. According to one embodiment, surfacing may comprise, for example, encoding the keyword 245 in an item description page as a community keyword 247, as depicted above with respect to FIG. 3B. Encoding the keyword 245 in the item description page may further comprise, for example, encoding the keyword 245 as a hyperlink, wherein a manipulation of the hyperlink by a user of the item description page may initiate one or more subsequent user interfaces 272 comprising a plurality of items 248 associated with the manipulated hyperlink. For example, FIG. 4 provides an example user interface 272 that may be rendered upon a manipulation of a hyperlink corresponding to the "magic" community keyword 247. As depicted in FIG. 4, a list 403 comprising a plurality of items 248 associated with the particular keyword may be shown, allowing the user the ability to discover additional content. Generation of the list will be described below with respect to 618.

Referring back to FIG. 6, in 618, one or more lists comprising one or more items 248 may be generated (or updated) for the keyword 245 identified in the request. According to one embodiment, the list may comprise item-keyword associations 239. For example, as shown in FIG. 4, a list for the keyword "magic" may be generated and encoded in a user interface, wherein the list comprises a plurality of movies associated with the "magic" keyword. The list may comprise items 248 associated with a respective keyword 245 and/or items 248 associated with keywords 245 similar to the respective keyword 245.

According to another embodiment, the list may comprise user-keyword associations 242. For example, as shown in FIG. 5, a list showing all keywords 245 associated by a user with each of the keyword's respective items may be generated and encoded in a user interface 272, wherein the list comprises a plurality of movies associated with keyword(s) provided by the user.

Referring back to FIG. 6, in 619, the keyword management application 218 may generate one or recommendations for one or more users based at least in part on keywords 245 manipulated and/or submitted by the one or more users. A recommendation may comprise, for example, users with interests related to the manipulated or submitted keywords 245, lists similar to the manipulated or submitted keywords 245, etc. As may be appreciated, the recommendation may assist a user in discovering additional content.

In 621, the keyword management application 218 may generate a reward for an initial user when the item-keyword association 239 has met the predefined threshold 236, thereby leading to the keyword being surfaced as a community keyword 247. An initial user may comprise, for example, the first user to initiate a request to associate the particular item with the particular keyword to form the item-keyword association 239. A reward may comprise, for example, providing the user with access to particular content, affording the user more weight in future requests, encoding an icon (e.g., a badge) next to the user's name in various user interfaces, etc. The reward may provide users of the system with an incentive to continue generating reliable item-keyword associations 239.

Figure 7:
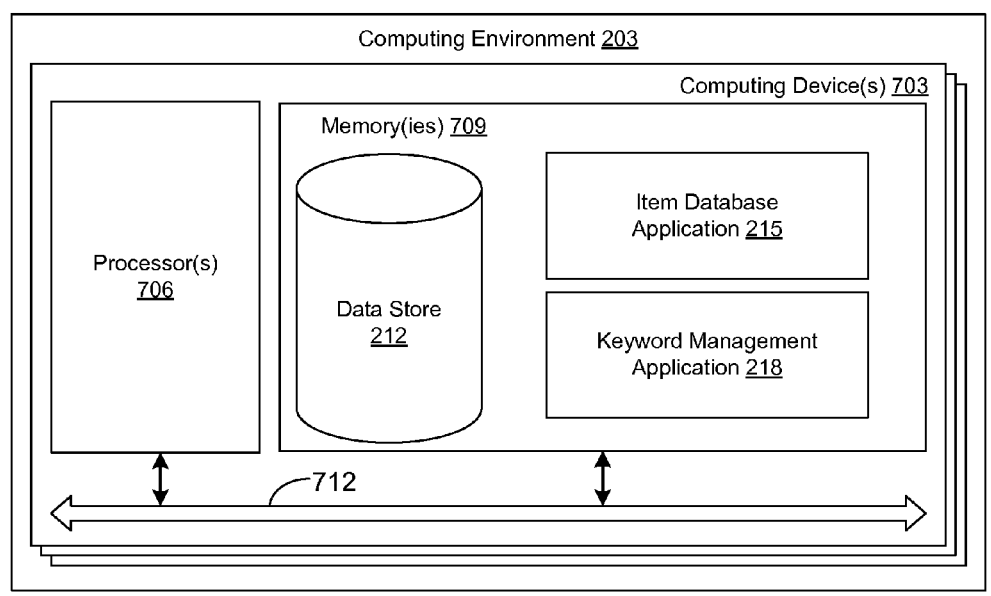
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are the item database application 215, the keyword management application 218, and potentially other applications. Also stored in the memory 709 may be a data store 212 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the item database application 215, the keyword management application 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the keyword management application 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item database application 215 and the keyword management application 218, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the item database application 215 and the keyword management application 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a program executable in at least one computing device stored thereon, comprising program code that, when executed by the at least one computing device, causes the at least one computing device to:
   identify at least one keyword included in a request generated by a user to suggest that the at least one keyword be associated with a movie in an electronic movie database;
   associate the at least one keyword with the movie in a memory to form a movie-keyword association;
   associate the at least one keyword with the user in the memory to form a user-keyword association;
   generate a weight for the movie-keyword association that indicates whether the at least one keyword is descriptive of the movie;
   determine whether to surface the at least one keyword for use in a community hyperlink that facilitates navigation in an electronic movie database based at least in part on the weight generated for the movie-keyword association meeting a predefined threshold, the predefined threshold indicating a reliability of the movie-keyword association;
   access a request received by the user to generate a network page that includes information associated with the movie;
   encode the at least one keyword as a user-specific hyperlink in a first region of the network page corresponding to the movie in accordance with the user-keyword association, the first region comprising a plurality of suggested keywords provided by the user in association with the movie; and
   encode the at least one keyword as the community hyperlink in a second region of the network page corresponding to the movie in response to a determination that the at least one keyword is to be surfaced for use in the community hyperlink,
   wherein a manipulation of the user-specific hyperlink or the community hyperlink generates at least one subsequent network page comprising information associated with a plurality of movies, individual ones of the plurality of movies being identified based at least in part on the at least one keyword.

2. The non-transitory computer-readable medium of claim 1, wherein the program further comprises program code that, when executed, causes the at least one computing device to generate an electronic reward for the user that generated the request to suggest that the at least one keyword be associated with the movie in response to the determination that the at least one keyword is to be surfaced for use in the community hyperlink.

3. The non-transitory computer-readable medium of claim 1, wherein the program further comprises program code that, when executed, causes the at least one computing device to:
   adjust the weight generated for the movie-keyword association that indicates whether the at least one keyword is descriptive of the movie based at least in part on an age of the at least one keyword; and
   determine whether to remove a use of the at least one keyword in the community hyperlink based at least in part on whether the weight generated for the movie-keyword association as adjusted meets the predefined threshold.

4. The non-transitory computer-readable medium of claim 1, wherein the weight is determined based at least in part on an age of the at least one keyword, a credibility of the user making the request, or a number of requests received to associate the movie with the at least one keyword.

5. A system, comprising:
   at least one computing device comprising at least one hardware processor; and
   an application executable in the at least one computing device, the application comprising program instructions that, when executed by the at least one hardware processor, cause the at least one computing device to:
   identify at least one keyword included in a request made by a user to suggest that the at least one keyword be associated with an item in an electronic database;
   associate the at least one keyword with the item in a memory to form an item-keyword association;
   generate a weight for the item-keyword association that indicates whether the at least one keyword is descriptive of the item;
   determine whether the weight generated for the item-keyword association meets a predefined threshold that indicates a descriptiveness of the at least one keyword for the item;
   encode the at least one keyword as a selectable user-specific component in user interface data for the item in response to a requester of the user interface data being the user that performed the request to suggest that the at least one keyword be associated with the item; and
   encode the at least one keyword as a selectable community component in the user interface data in response to determining that the weight generated for the item-keyword association met the predefined threshold.

6. The system of claim 5, wherein the selectable user-specific component further comprises a first hyperlink and the selectable community component further comprises a second hyperlink.

7. The system of claim 6, wherein a manipulation of the first hyperlink or the second hyperlink causes the at least one computing device to generate subsequent user interface data comprising information associated with a plurality of items identified based at least in part on the at least one keyword.

8. The system of claim 5, wherein the application further comprises program instructions that, when executed by the at least one hardware processor, cause the at least one computing device to associate the keyword with the user in the memory to form a user-keyword association.

9. The system of claim 6, wherein a manipulation of the first hyperlink causes the at least one computing device to generate subsequent user interface data comprising information associated with a plurality of items, individual ones of the plurality of items being identified based at least in part on at least one of a plurality of previously suggested keywords provided by the user.

10. The system of claim 5, wherein the application further comprises program instructions that, when executed by the at least one hardware processor, cause the at least one computing device to generate an electronic reward for a predefined number of users who initiated at least one of a plurality of first received requests to associate the at least one keyword with the item in response to weight generated for the item-keyword association meeting the predefined threshold.

11. The system of claim 5, wherein the item is a movie or a product available for consumption in an electronic marketplace.

12. The system of claim 5, wherein the weight is determined based at least in part on an age of the at least one keyword, a credibility of the user making the request, or a number of requests received to associate the item with the at least one keyword.

13. A computer-implemented method, comprising:
- identifying, by at least one computing device comprising at least one hardware processor, at least one keyword set forth in a request received from a client device, wherein the request is made by a user of the client device to suggest that the at least one keyword be associated with an item;
- associating, by the at least one computing device, the at least one keyword with the item in a memory to form an item-keyword association;
- determining, by the at least one computing device, whether a weight determined for the item-keyword association meets a predefined threshold that indicates a descriptiveness of the at least one keyword for the item;
- encoding, by the at least one computing device, the at least one keyword as a first hyperlink in a user interface, in response to a requester of the user interface being the user that made the request to suggest that the at least one keyword be associated with the item; and
- encoding, by the at least one computing device, the at least one keyword as a second hyperlink in the user interface in response to the weight determined for the item-keyword association meeting a predefined threshold.

14. The computer-implemented method of claim 13, wherein a selection of the first hyperlink or the second hyperlink causes the at least one computing device to generate at least one subsequent user interface comprising information associated with a plurality of items, individual ones of the plurality of items being identified based at least in part on the at least one keyword selected.

15. The computer-implemented method of claim 13, further comprising associating, by the at least one computing device, the at least one keyword with the user in the memory to form a user-keyword association.

16. The computer-implemented method of claim 15, wherein a selection of the first hyperlink causes the at least one computing device to generate at least one subsequent user interface comprising information associated with a plurality of items, individual ones of the plurality of items being identified based at least in part on at least one of a plurality of previously suggested keywords provided by the user in associated with the plurality of items.

17. The computer-implemented method of claim 13, further comprising, in response to the weight determined for the item-keyword association meeting the predefined threshold, generating, by the at least one computing device, an electronic reward for a predefined number of users who made at least one of a plurality a first received requests to associate the at least one keyword with the item in the memory.

18. The computer-implemented method of claim 13, wherein the user interface comprises a network page communicated by the at least one computing device to the client device over a network.

19. The computer-implemented method of claim 13, wherein the weight is determined based at least in part on an age of the at least one keyword, a credibility of the user initiating the request, or a number of requests received to associate the item with the at least one keyword.

20. The computer-implemented method of claim 13, wherein the item is a movie or a product available for consumption in an electronic marketplace.

* * * * *